United States Patent
Higashiyama et al.

(10) Patent No.: US 7,040,102 B2
(45) Date of Patent: May 9, 2006

(54) VEHICLES AND ELECTROMAGNETIC CLUTCHES FOR COMPRESSORS FOR SUCH VEHICLES

(75) Inventors: Akiyoshi Higashiyama, Iseaki (JP); Hiromitsu Adachi, Wako (JP); Hideki Watanabe, Wako (JP); Shinichirou Wakou, Wako (JP)

(73) Assignees: Sanden Corporation, Gunma (JP); Honda Motor Co., Ltd., Tokyo (JP)

( * ) Notice: Subject to any disclaimer, the term of this patent is extended or adjusted under 35 U.S.C. 154(b) by 29 days.

(21) Appl. No.: 10/796,303

(22) Filed: Mar. 10, 2004

(65) Prior Publication Data

US 2004/0211197 A1  Oct. 28, 2004

(30) Foreign Application Priority Data

Mar. 11, 2003 (JP) .............................. 2003-065403

(51) Int. Cl.
*B60H 1/32* (2006.01)
*F25B 1/00* (2006.01)
*F25B 49/00* (2006.01)

(52) U.S. Cl. .................. 62/133; 62/228.1; 62/236; 418/69

(58) Field of Classification Search .................. 62/133, 62/228.1, 236; 418/69; 192/84.961
See application file for complete search history.

(56) References Cited

U.S. PATENT DOCUMENTS

| | | | |
|---|---|---|---|
| 4,591,318 A | 5/1986 | Elson | |
| 4,990,071 A | 2/1991 | Sugimoto | |
| 5,385,453 A | 1/1995 | Fogt et al. | |
| 5,435,144 A | 7/1995 | Kalmbach | |
| 5,687,823 A * | 11/1997 | Nakagawa et al. | .... 192/84.961 |
| 5,755,564 A | 5/1998 | Machida et al. | |
| 5,867,996 A * | 2/1999 | Takano et al. | ................. 62/175 |
| 5,983,656 A | 11/1999 | Tokumasu | |
| 5,984,069 A * | 11/1999 | Takahashi | .............. 192/84.961 |
| 6,109,045 A | 8/2000 | Takenaka | |
| 6,192,155 B1 | 2/2001 | Fan | |
| 6,217,297 B1 | 4/2001 | Tsumagari et al. | |
| 6,230,507 B1 | 5/2001 | Ban et al. | |
| 6,234,769 B1 | 5/2001 | Sakai et al. | |
| 6,247,899 B1 | 6/2001 | Ban et al. | |
| 6,287,081 B1 | 9/2001 | Tamegai et al. | |
| 6,334,755 B1 | 1/2002 | Coudray et al. | |
| 6,375,436 B1 | 4/2002 | Irie et al. | |
| 6,443,712 B1 | 9/2002 | Sakai et al. | |
| 6,543,243 B1 | 4/2003 | Mohrmann et al. | |
| 2001/0047659 A1 | 12/2001 | Nakamura et al. | |
| 2001/0049943 A1 | 12/2001 | Nakamura et al. | |

(Continued)

FOREIGN PATENT DOCUMENTS

DE  19513710  10/1995

(Continued)

*Primary Examiner*—Marc Norman
(74) *Attorney, Agent, or Firm*—Baker Botts L.L.P.

(57) ABSTRACT

An electromagnetic clutch for a compressor includes a rotor, an armature, an electromagnetic coil for bringing the rotor into contact with the armature and for separating the rotor from the armature, and a temperature detection device, such as a temperature fuse or a temperature switch, or both, for detecting an excessive increase in temperature ascribed to slippage between the rotor and the armature or a temperature increase of refrigerant discharged from the compressor. An electric circuit of the temperature detection device is separated from the electric circuit of the electromagnetic coil. An abnormal condition may be accurately detected by the separate circuit structure, and a proper response to the abnormal condition may be taken quickly.

14 Claims, 4 Drawing Sheets

U.S. PATENT DOCUMENTS

| | | |
|---|---|---|
| 2002/0001533 A1* | 1/2002 | Nonaka et al. ............... 418/69 |
| 2003/0053916 A1 | 3/2003 | Terauchi |
| 2003/0136138 A1 | 7/2003 | Tsuboi et al. |
| 2003/0152467 A1 | 8/2003 | Higashiyama et al. |
| 2004/0000156 A1 | 1/2004 | Inoue et al. |
| 2004/0001760 A1 | 1/2004 | Yoshii et al. |
| 2004/0020229 A1 | 2/2004 | Adachi et al. |
| 2004/0211197 A1 | 10/2004 | HIgashiyama et al. |

FOREIGN PATENT DOCUMENTS

| | | |
|---|---|---|
| EP | 1213166 | 6/2002 |
| JP | 687678 | 12/1984 |
| JP | 60153885 | 10/1985 |

* cited by examiner

VEHICLES AND ELECTROMAGNETIC CLUTCHES FOR COMPRESSORS FOR SUCH VEHICLES

BACKGROUND OF THE INVENTION

1. Field of the Invention

The present invention relates generally to vehicles and electromagnetic clutches for compressors for use in air conditioning systems such vehicles. In particular, the present invention relates to vehicles and electromagnetic clutches for compressors, in which an excessive temperature elevation in an electromagnetic clutch may be accurately detected, thereby ensuring proper operation of the electromagnetic clutch and a compressor.

2. Description of Related Art

Figure 5:
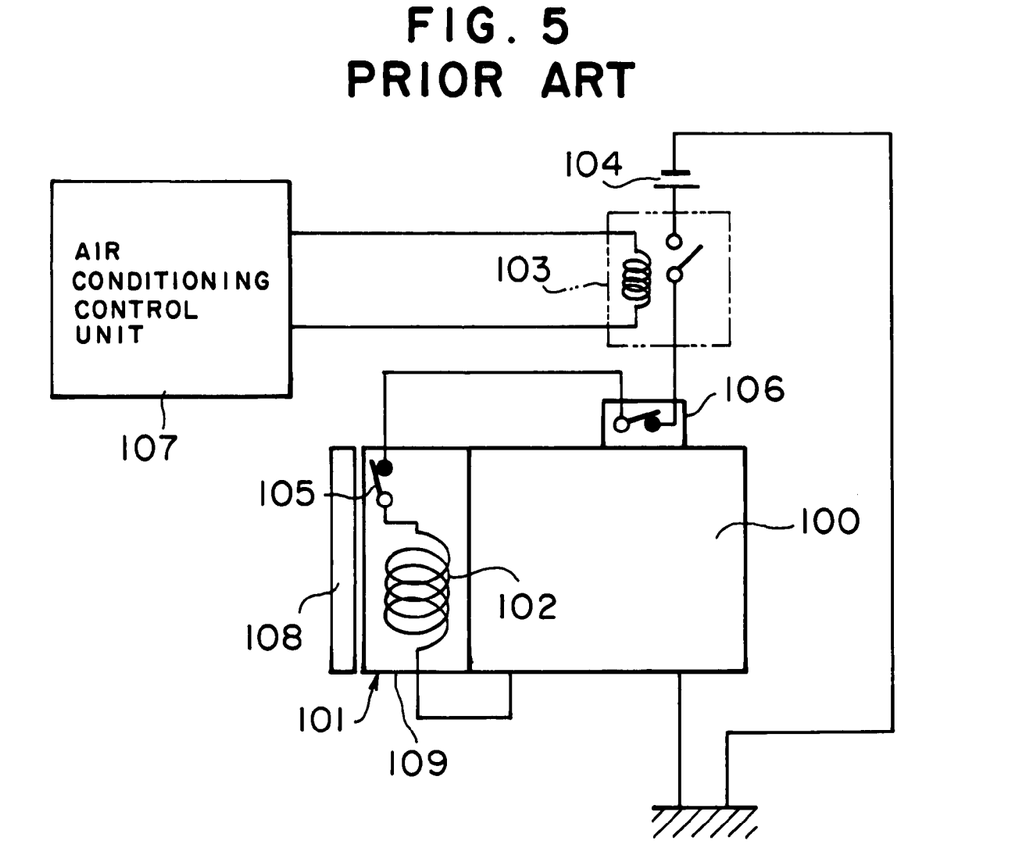
FIG. 5 is a schematic diagram of an air conditioning system using a known electromagnetic clutch for a compressor.

Generally, in the drive control of a compressor used in a refrigeration cycle of an air conditioning system for vehicles, the transmission and interruption of a drive force from a drive source, e.g., an engine, to the compressor are controlled by an electromagnetic clutch. FIG. 5 depicts a schematic diagram of a known electromagnetic clutch for a compressor. In FIG. 5, electromagnetic clutch 101 is mounted on compressor 100 for controlling the transmission of a drive force from a drive source, such as an engine of a vehicle. Electromagnetic clutch 101 has electromagnetic coil 102, and electromagnetic coil 102 is connected to a power source 104 via air conditioning relay 103 and temperature switch 106. Further, electromagnetic clutch 101 has armature 108 rotated integrally with a drive shaft (not shown) of compressor 100 and rotor 109, to which a driving force from a drive source (e.g., an engine) is applied through a drive force transmission means, such as a pulley (not shown). When electromagnetic coil 102 is excited by closing the contact point of relay 103 and thereby causing a current to flow in electromagnetic coil 102 in response to a signal from air conditioning control unit 107, armature 108 is attracted toward rotor 109 by the electromagnetic attractive force generated by electromagnetic coil 102, and armature 108 and rotor 109 are brought into contact with each other. Consequently, the driving force is transmitted to the drive shaft of compressor 100, thereby driving compressor 100. In contrast, when the excitation of electromagnetic coil 102 is terminated by opening the contact point of relay 103, armature 108 is separated from rotor 109, thereby interrupting the transmission of the driving force.

In addition, temperature fuse 105 is interposed between electromagnetic coil 102 and temperature switch 106, as shown in Japanese Utility Model Laid-Open Nos. 55-175635 and JP-A-2000-230579. When the drive shaft of compressor 100 becomes locked for certain reasons, slippage occurs between armature 108 and rotor 109 and the temperature of a contact portion thereof is elevated to an excessive level by friction. Consequently, temperature fuse 105 melts, and the circuit is opened. As a result of this fuse failure, driving of compressor 100 is stopped, overload conditions of electromagnetic clutch 101 and compressor 100 are prevented, and further, an overload condition to the drive source is prevented, thereby preventing these devices from being damaged.

Temperature switch 106 also is provided on a surface of compressor 100 for detecting the temperature of the discharged heat transfer medium, e.g., the refrigerant. When the drive shaft of compressor 100 becomes locked for certain reasons and the temperature of the heat-transfer medium discharged from compressor 100 increases to an excessive level, temperature switch 106 operates to open, the flow of current to electromagnetic coil 102 is interrupted, armature 108 is separated from rotor 109, the transmission of the driving force from a drive source is interrupted, and electromagnetic clutch 101 and compressor 100 and, ultimately, the drive source, may be protected.

In the above-described circuit, however, because electromagnetic coil 102 and temperature fuse 105 are connected in series, even if temperature fuse 105 melts, control unit 107 cannot detect the failure of temperature fuse 105 unless another detection means is provided. Therefore, even in a situation in which temperature fuse 105 melts, control unit 107 may continue to operate to direct a flow of current to electromagnetic coil 102. Further, when temperature switch 106 operates, a similar phenomenon may occur, specifically, in the above-described circuit, air conditioning control unit 107 is unable to recognize an abnormal condition of compressor 100, unless another detection means is provided. Consequently, because control unit 107 continues to operate heat exchangers and the like even when compressor 100 is stopped, power may be wasted, and operation of the vehicle may be adversely affected. Moreover, if compressor 100 is a hybrid compressor driven by two drive sources different from each other, e.g., an engine and an electric motor incorporated into the compressor, a malfunction may occur, such that the compressor may be attempted to be driven by the incorporated electric motor, even during an abnormal conditions.

SUMMARY OF THE INVENTION

Accordingly, a need has arisen for vehicles and electromagnetic clutches for compressors for use in air conditioning systems for such vehicles, which overcome these and other deficiencies of the related art. A technical advantage of the present invention is that when an abnormal condition occurs in a compressor, or other portion of the air conditioning system the condition is recognized quickly and accurately by a control unit. Consequently, wasteful consumption of power and system malfunction may be avoided, overload to electromagnetic clutch and compressor also may be prevented, and the respective devices of the air conditioning system and the vehicle may be more completely protected.

In an embodiment of the present invention, an electromagnetic clutch for a compressor comprises a rotor which receives a driving force from a drive source; an armature rotated integrally with a drive shaft of the compressor; an electromagnetic coil for bringing the rotor into contact with the armature by generating an electromagnetic attractive force due to the excitation of the coil to transmit the driving force to the drive shaft and for separating the rotor from the armature by terminating the excitation of the coil to interrupt the transmission of the driving force to the drive shaft; and a detection means for detecting an excessive increase in temperature. The detection means is provided via a first electric circuit separate from a second electric circuit of the electromagnetic coil. The detection means may detect an excessive increase in temperature, which may be ascribed to slippage between the rotor and the armature when the rotor and the armature are brought into contact with each other. Further, the detection means may detect an excessive increase in temperature ascribed to a temperature increase of compressed fluid (compressed refrigerant) discharged from the compressor.

The detection means comprises, for example, a temperature switch or a temperature fuse, or both. When the above-described compressor is used in an air conditioning system for a vehicle, the detection means preferably is connected to an air conditioning control unit for the air conditioning system. By connecting the detection means to the control unit, when a certain abnormal condition occurs in the compressor, the control unit immediately may detect this condition as an excessive increase in temperature; an appropriate response, such as terminating operation of the air conditioning system, may be enacted quickly, and, therefore, the electromagnetic clutch, the compressor, and heat exchangers in the air conditioning system may be protected properly.

In addition, the above-described compressor may be a hybrid compressor driven by two separate drive sources different, including an electric motor incorporated into the compressor. In the present invention, when an abnormal condition occurs in the electromagnetic clutch, or other portions of the air conditioning system and the transmission of the driving force from an external drive source (e.g., an engine) is interrupted, the condition is accurately detected by the detection means, and occurrence of malfunction, such as driving by or activation of the incorporated electric motor may be terminated promptly.

In another embodiment of the present invention, a vehicle comprises an electromagnetic clutch for a compressor, which includes a rotor which receives a driving force from a drive source; an armature rotated integrally with a drive shaft of the compressor; an electromagnetic coil for bringing the rotor into contact with the armature by an electromagnetic attractive force due to the excitation of the coil to transmit the driving force to the drive shaft and for separating the rotor from the armature by terminating the excitation of the coil to interrupt the transmission of the drive forcing to the drive shaft; and a detection means for detecting an excessive temperature elevation. The detection means is provided via a first electric circuit separate from a second electric circuit of the electromagnetic coil. The detection means may detect an excessive increase in temperature ascribed to slippage between the rotor and the armature when the rotor and the armature are brought into contact with each other. Further, the detection means may detect an excessive increase in temperature ascribed to a temperature increase of compressed fluid (compressed refrigerant) discharged from the compressor.

In addition, the detection means in this vehicle comprises a temperature switch or a temperature fuse, or both. When the compressor is used in an air conditioning system for the vehicle, the detection means preferably is connected to an air conditioning control unit for the air conditioning system. When the detection means detects an excessive increase in temperature, operation of the air conditioning system may be terminated. The compressor may be a hybrid compressor driven by two separate drive sources different from each other and including an electric motor incorporated into the compressor, and when the detection means detects an excessive increase in temperature, driving by or activation of the electric motor may be terminated.

In the present invention, because the second electric circuit of the electromagnetic coil and the first electric circuit of the detection means for detecting an excessive increases in temperature are provided separately from each other, the detection means may be connected directly to the control unit for controlling the drive of the compressor. Therefore, when an abnormal condition occurs in the compressor or other portions of the air conditioning system and this condition is detected by the detection means, the signal may be immediately sent to the control unit, and the control unit may recognized the abnormal condition quickly and accurately. Consequently, an appropriate response, such as terminating operation of the compressor and the like, may be enacted quickly; overload conditions of the electromagnetic clutch and the compressor may be prevented, and these devices may be protected properly. Moreover, because the abnormal condition may be detected quickly and accurately, malfunctions may be prevented, and wasteful consumption of power may be more completely avoided.

Other objects, features, and advantages of the present invention will be apparent to persons of ordinary skill in the art from the following detailed description of preferred embodiments of the present invention and the accompanying drawings.

BRIEF DESCRIPTION OF THE DRAWINGS

For a more complete understanding of the present invention, the needs satisfied thereby, and objects, features, and advantages thereof, reference now is made to the following description taken in connection with the accompanying drawings.

DETAILED DESCRIPTION OF PREFERRED EMBODIMENTS

Figure 1:
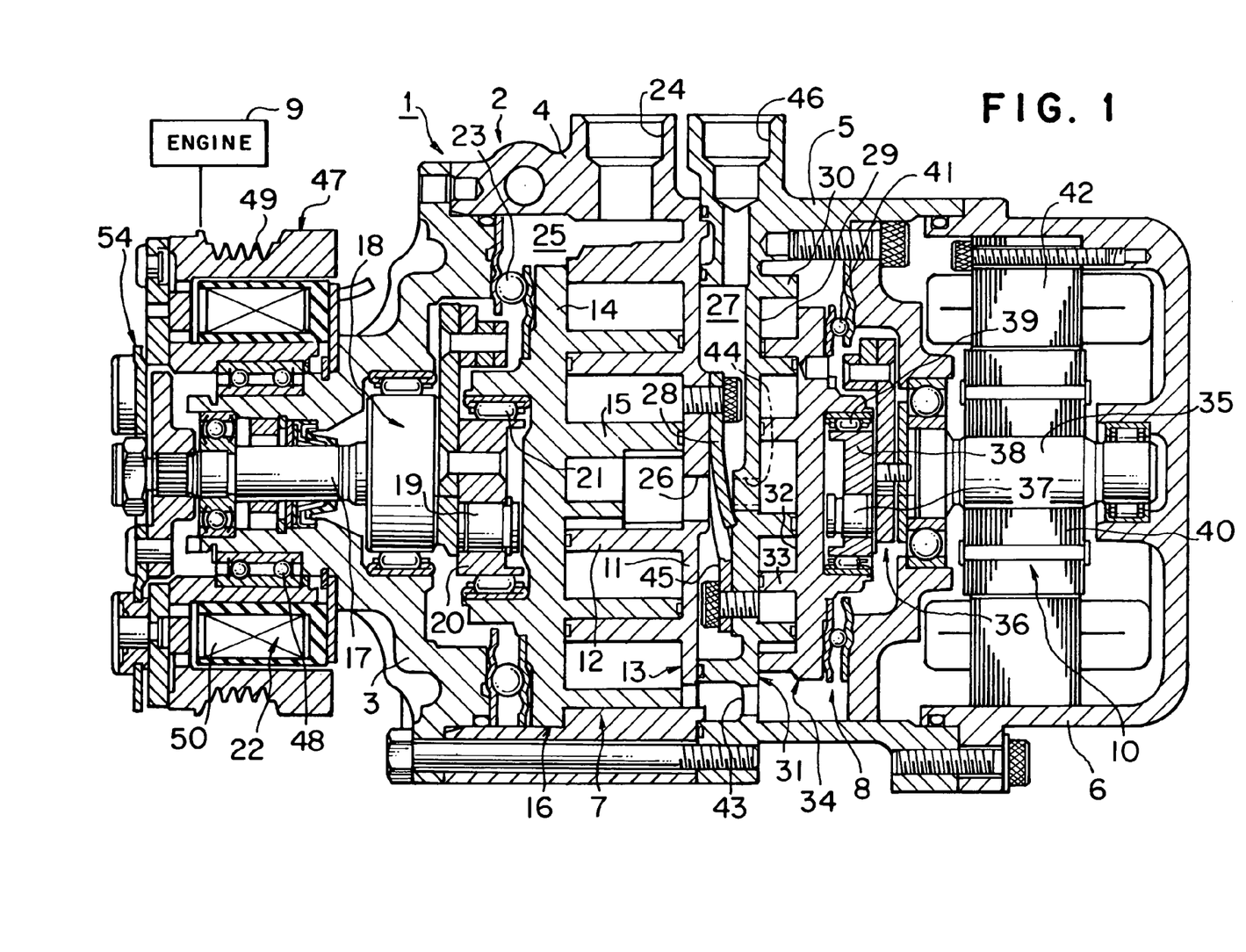
FIG. 1 is a vertical cross-sectional view of a compressor using an electromagnetic clutch, according to a first embodiment of the present invention.

The present invention is described below with respect to a compressor used in a refrigerant circuit of an air conditioning system for vehicles. FIG. 1 depicts a compressor using an electromagnetic clutch according to a first embodiment of the present invention. In FIG. 1, compressor 1 is depicted as a hybrid compressor driven by two separate drive sources, different from each other and including an electric motor incorporated into compressor 1. Hybrid compressor 1 has housing 2, and housing 2 is formed from front housing 3, first housing 4, second housing 5, and rear housing 6 connected in this order from the left side of FIG. 1. First compression mechanism 7 and second compression mechanism 8 are provided within housing 2.

First compression mechanism 7 is driven by engine 9 provided as a vehicle drive source. Second compression mechanism 8 is driven by electric motor 10 incorporated into rear housing 6. Driving by engine 9 and driving by electric motor 10 may be carried out in either of a simultaneous drive condition or a sole drive condition using only one drive source. Therefore, both compression mechanisms 7 and 8 also may be driven either simultaneously or individually. First compression mechanism 7 has fixed scroll 13 comprising end plate 11 and spiral element 12 integrally formed with end plate 11, and orbital scroll 16 comprising end plate 14 and spiral element 15 integrally formed with end plate 14. Spiral element 12 of fixed scroll 13 and spiral element 15 of orbital scroll 16 engage each other so as to be angularly shifted from each other. In this embodiment, fixed scroll 13 may be formed integrally with first housing 4 of compressor 1.

Crank mechanism 18 (a crank shaft) is formed integrally with drive shaft 17 of first compression mechanism 7 at an end portion of drive shaft 17. Crank pin 19 of crank mechanism 18 is provided at a position eccentric from the axis of drive shaft 17, and it is fitted into eccentric bush 20 with a small tolerance. Eccentric bush 20 is inserted rotatably into drive bearing 21 which is inserted into a projecting portion of orbital scroll 16. In this embodiment, when a driving force from engine 9, which is a drive source for driving only first compression mechanism 7, is transmitted to drive shaft 17 via electromagnetic clutch 22 provided at an end of drive shaft 17; eccentric bush 20, into which crank pin 19 is inserted, rotates. Accompanying this rotation, an orbital movement is given to orbital scroll 16 which is prevented from being rotated by ball coupling 23, which is provided as a rotation preventing mechanism.

Accompanying the orbital movement of orbital scroll 16, a fluid (e.g., a refrigerant) is drawn into suction chamber 25 through suction port 24, and the drawn fluid is received into fluid pockets formed by the engagement of spiral elements 12 and 15 through their radially outer ends. The fluid pockets formed by the engagement of spiral elements 12 and 15 are moved toward the central portion of fixed scroll 13 while the volumes of these pockets gradually decrease, and the fluid in the fluid pockets is compressed by this inward motion. The compressed fluid is discharged into discharge chamber 27 through discharge hole 26 opened on end plate 11. Discharge hole 26 is opened and closed by reed valve 28 provided as a discharge valve in discharge chamber 27.

Second compression mechanism 8 has fixed scroll 31 comprising end plate 29 and spiral element 30 integrally formed with end plate 29, and orbital scroll 34 comprising end plate 32 and spiral element 33 integrally formed with end plate 32. In this embodiment, fixed scroll 31 may be formed integrally with housing 5 of compressor 1. Spiral element 30 of fixed scroll 31 and spiral element 33 of orbital scroll 34 are engaged with each other so as to be shifted in angle from each other. In this embodiment, fixed scroll 13 of first compression mechanism 7 and fixed scroll 31 of second compression mechanism 8 are disposed back-to-back, and discharge chamber 27 is formed between both fixed scrolls 13 and 31.

Crank mechanism 36 (a crank shaft) is formed integrally with drive shaft 35 of second compression mechanism 8 at an end portion of drive shaft 35. Crank pin 37 of crank mechanism 36 is provided at a position eccentric from the axis of drive shaft 35, and it is fitted into eccentric bush 38 with a small tolerance. Eccentric bush 38 is inserted rotatably into drive bearing 39 which is inserted into a projecting portion of orbital scroll 34. Incorporated electric motor 10 has rotor 40 fixed to drive shaft 35 and stator 42 fixed to the side of rear housing 6. In this embodiment, when a driving force from incorporated electric motor 10, which is a drive source for driving only second compression mechanism 8, is transmitted to drive shaft 35 via rotor 40 fixed to drive shaft 35; eccentric bush 38, into which crank pin 37 is inserted, rotates. Accompanying this rotation, an orbital movement is given to orbital scroll 34 which is prevented from being rotated by ball coupling 41, which is provided as a rotation preventing mechanism.

In this embodiment, the fluid (e.g., refrigerant) drawn into compressor 1 through suction port 24 and suction chamber 25 is directed into the side of second compression mechanism 8 through communication hole 43 provided on end plate 29 of fixed scroll 31. Accompanying the orbital movement of orbital scroll 34, the fluid is received into fluid pockets formed by the engagement of spiral elements 30 and 33 through their radially, outer ends. The fluid pockets formed by the engagement of spiral elements 30 and 33 are moved toward the central portion of fixed scroll 31 while the volumes of these pockets gradually decrease, and the fluid in the fluid pockets is compressed by this inward motion. The compressed fluid is discharged into discharge chamber 27 through discharge hole 44 opened on end plate 29. Discharge hole 44 is opened and closed by reed valve 45 provided as a discharge valve in discharge chamber 27. Discharge chamber 27 communicates with discharge port 46, and the discharged compressed fluid is sent from discharge port 46 to a refrigeration circuit of an air conditioning system (not shown).

Figure 2:
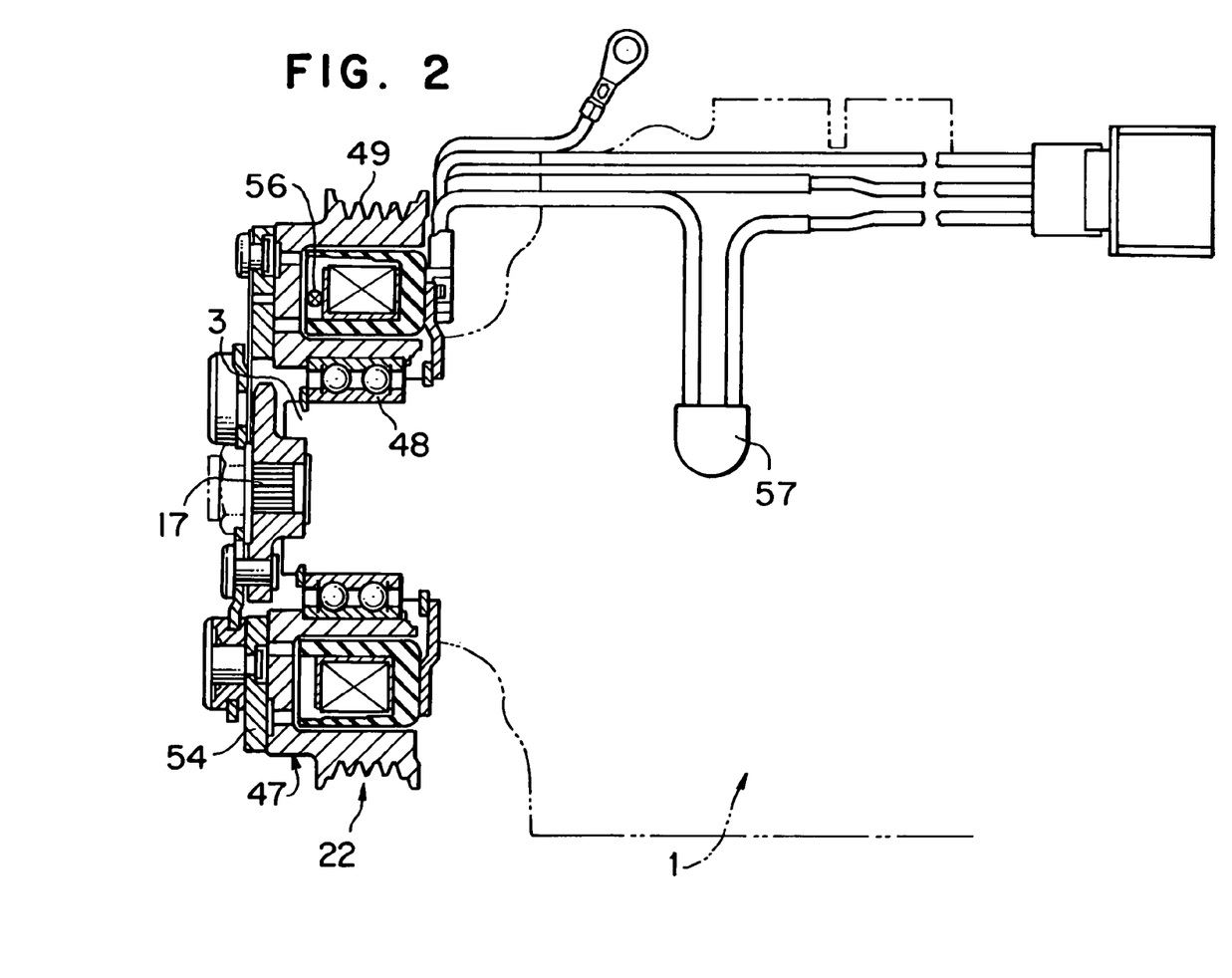
FIG. 2 is a cross-sectional view of the electromagnetic clutch of the first embodiment depicted in FIG. 1.
Figure 3:
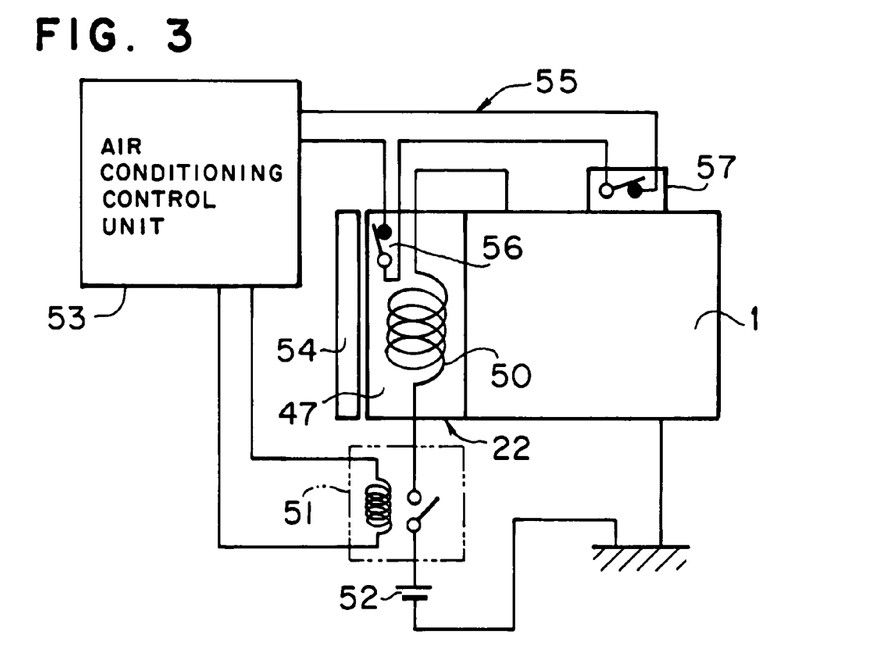
FIG. 3 is a schematic diagram of an air conditioning system using the compressor with the electromagnetic clutch of the first embodiment depicted in FIG. 1.

Referring to FIGS. 2 and 3, electromagnetic clutch 22 for compressor 1 has rotor 47, and rotor 47 is mounted rotatably at a position of the end of front housing 3 via bearing 48. Engaging portion 49 is formed on rotor 47 for engaging a belt (not shown) which transmits a driving force from engine 9. Electromagnetic coil 50, which is formed by winding a conductive wire, is provided in rotor 47. Electromagnetic coil 50 is connected to power source 52 via air conditioning relay 51, and air conditioning relay 51 is connected to air conditioning control unit 53 for controlling the air conditioning system. When the contact point of air conditioning relay 51 is closed in response to a signal from air conditioning control unit 53, electromagnetic coil 50 is excited and generates an electromagnetic attractive force. As a result of this electromagnetic attractive force, armature 54 may be driven integrally with drive shaft 17 and is attracted to rotor 47, such that armature 54 and rotor 47 are brought into contact with each other. As a result of this contact, the driving force from engine 9 is transmitted to drive shaft 17, and first compression mechanism 7 of compressor 1 is driven. In contrast, when the contact point of air conditioning relay 51 is opened and the excitation of electromagnetic coil 50 is terminated, armature 54 is separated from rotor 47, the transmission of the driving force from engine 9 is interrupted, and the driving of first compression mechanism 7 is terminated.

Electromagnetic clutch 22 also is connected to air conditioning control unit 53 by electric circuit 55 separate from the electric circuit including electromagnetic coil 50, air conditioning relay 51 and power source 52. In this embodiment, temperature fuse 56 and temperature switch 57 are provided in electric circuit 55 as means for detecting an excessive increase in temperature. When slippage occurs between rotor 47 and armature 54, such that the temperature of the contacting portion thereof increases excessively, temperature fuse 56 melts, thereby opening electric circuit 55. Temperature switch 57 also detects an excessive increase in temperature, and when the temperature of refrigerant discharged from compressor 1 increases excessively, temperature switch 57 operates, thereby opening electric circuit 55. In this embodiment, when temperature fuse 56 melts or temperature switch 57 operates, or both, and electric circuit 55 is opened, the signal immediately is sent to air conditioning control unit 53. Then, a signal is issued from air conditioning control unit 53, air conditioning relay 51 is opened and the excitation of electromagnetic coil 50 is terminated. Consequently, armature 54 is separated from rotor 47, and the transmission of the driving force from engine 9 is interrupted.

Further, air conditioning control unit 53 also sends a signal to incorporated electric motor 10 of compressor 1, and if electric motor 10 is being driven, the driving of motor 10 is stopped immediately. If the drive of electric motor 10 is stopped, the activation of electric motor 10 is prohibited by the signal from air conditioning control unit 53. Further, air conditioning control unit 53 also sends signals to other devices, such as heat exchangers in a heater unit (not shown), and when electric circuit 55 is opened, the operation of such other devices is terminated.

In this embodiment, the electric circuit of electromagnetic coil 50 and electric circuit 55 including temperature fuse 56 and temperature switch 57 are separated from each other, and temperature fuse 56 and temperature switch 57 are detection means for excessive increases in temperature and are substantially connected directly to air conditioning control unit 53. Therefore, when an excessive increase in temperature is detected by such detection means, air conditioning control unit 53 immediately may detect this abnormal condition, and the excitation of electromagnetic coil 50 is terminated and an appropriate response, such as terminating operation of compressor 1, may be enacted quickly. Consequently, overload conditions of electromagnetic clutch 22 and compressor 1 may be prevented, and these devices may be protected properly. Further, wasteful consumption of power may be avoided.

Further, when an abnormal condition is detected by air conditioning control unit 53, because the driving or the activation of electric motor 10 is terminated quickly, compressor 1 may be more completely protected. Moreover, because driving or operation of other devices, such as heat exchangers also may be terminated, while the other devices are properly protected, wasteful consumption of power may be more completely avoided.

Figure 4:
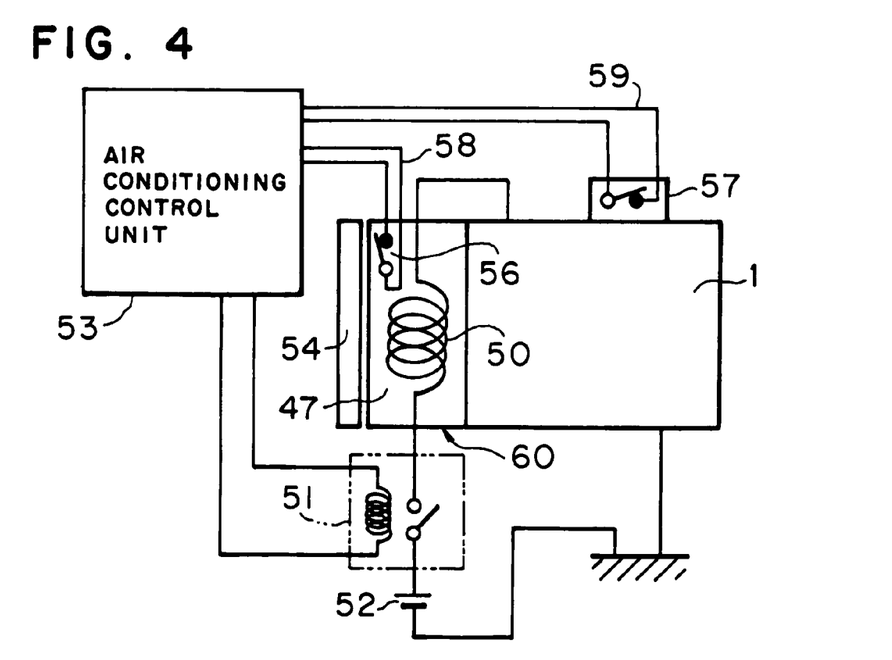
FIG. 4 is a schematic diagram of an air conditioning system using an electromagnetic clutch for a compressor, according to a second embodiment of the present invention.

FIG. 4 depicts schematic diagram of an electric circuit 58 for an electromagnetic clutch for compressor 1, according to a second embodiment of the present invention. In FIG. 4, the same labels are provided to substantially same members as those of FIG. 3 which depict the first embodiment. In electromagnetic clutch 60 of this embodiment, electric circuit 58 for temperature fuse 56 and electric circuit 59 for temperature switch 57 are formed as electric circuits separate from each other, and electric circuits 58 and 59 are independently connected to air conditioning control unit 53, respectively. Of course, these electric circuits 58 and 59 are separated from the electric circuit of electromagnetic coil 50. In such a configuration, when an abnormal condition occurs, air conditioning control unit 53 readily may recognize whether temperature fuse 56 melts or temperature switch 57 operates. Therefore, the main reason for the abnormal condition readily may be determined to be due to a temperature increase ascribed to slippage between rotor 47 and armature 54 or to a temperature increase ascribed to the refrigerant having an excessive temperature when discharged from compressor 1. Where, if re-activation of compressor 1 is possible after compressor 1 is stopped, it may be determined that temperature switch 57 has operated. If re-activation is impossible, it may be determined that temperature fuse 56 has melted.

While the invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein. It is intended that the specification and the described examples are considered exemplary only, with the true scope of the invention indicated by the following claims.

What is claimed is:

1. An electromagnetic clutch for a compressor comprising:
    a rotor which receives a driving force from a drive source;
    an armature rotated integrally with a drive shaft of said compressor;
    an electromagnetic coil for bringing said rotor into contact with said armature by an electromagnetic attractive force due to the excitation of said coil to transmit said driving force to said drive shaft and for separating said rotor from said armature by terminating the excitation of said coil to interrupt the transmission of said driving force to said drive shaft; and
    a detection means for detecting an excessive increase in temperature, said detection means being provided via a first electric circuit separate from a second electric circuit of said electromagnetic coil; wherein said compressor is a hybrid compressor driven by two separate drive sources, including an electric motor incorporated into said compressor, and when said detection means detects an excessive increase in temperature, driving by or activation of said electric motor is terminated.

2. The electromagnetic clutch for a compressor of claim 1, wherein said detection means detects an excessive increase in temperature ascribed to slippage between said rotor and said armature when said rotor and said armature are brought into contact with each other.

3. The electromagnetic clutch for a compressor of claim 1, wherein said detection means detects an excessive increase in temperature ascribed to a temperature increase of compressed fluid discharged from said compressor.

4. The electromagnetic clutch for a compressor of claim 1, wherein said detection means comprises a temperature switch or a temperature fuse, or both.

5. The electromagnetic clutch for a compressor of claim 1, wherein an air conditioning system for a vehicle comprises said compressor, and said detection means is connected to an air conditioning control unit for said air conditioning system.

6. The electromagnetic clutch for a compressor of claim 5, wherein when said detection means detects an excessive increase in temperature, operation of said air conditioning system is stopped.

7. A vehicle comprising an electromagnetic clutch for a compressor including:
    a rotor which receives a driving force from a drive source;
    an armature rotated integrally with a drive shaft of said compressor;
    an electromagnetic coil for bringing said rotor into contact with said armature by an electromagnetic attractive force due to the excitation of said coil to transmit said drive forcing to said drive shaft and for separating said rotor from said armature by terminating the excitation of said coil to interrupt the transmission of said driving force to said drive shaft; and
    a detection means for detecting an excessive increase in temperature, said detection means being provided via a first electric circuit separate from a second electric circuit of said electromagnetic coil; wherein said compressor is a hybrid compressor driven by two separate drive sources, including an electric motor incorporated into said compressor, and when said detection means detects an excessive increase in temperature, driving by or activation of said electric motor is terminated.

8. The vehicle of claim 7, wherein said detection means detects an excessive increase in temperature ascribed to slippage between said rotor and said armature when said rotor and said armature are brought into contact with each other.

9. The vehicle of claim 7, wherein said detection means detects an excessive increase in temperature ascribed to a temperature increase of compressed fluid discharged from said compressor.

10. The vehicle of claim 7, wherein said detection means comprises a temperature switch or a temperature fuse, or both.

11. The vehicle of claim 7, wherein in an air conditioning system for the vehicle comprise said compressor, and said detection means is connected to an air conditioning control unit for said air conditioning system.

12. The vehicle of claim 11, wherein when said detection means detects an excessive increase temperature, operation of said air conditioning system is terminated.

13. An electromagnetic clutch for a compressor comprising:
a rotor which receives a driving force from a drive source;
an armature rotated integrally with a drive shaft of said compressor;
an electromagnetic coil for bringing said rotor into contact with said armature by an electromagnetic attractive force due to the excitation of said coil to transmit said driving force to said drive shaft and for separating said rotor from said armature by terminating the excitation of said coil to interrupt the transmission of said driving force to said drive shaft; and
a detection means for detecting an excessive increase in temperature, said detection means being provided via a first electric circuit separate from a second electric circuit of said electromagnetic coil; wherein said detection means detects an excessive increase in temperature ascribed to a temperature increase of compressed fluid discharged from said compressor.

14. A vehicle comprising the electromagnetic clutch of claim 13.

* * * * *